Dec. 28, 1948.   A. O. ROBERTS ET AL   2,457,729
AUTOMATIC BRAKE CONTROL
Filed April 19, 1945
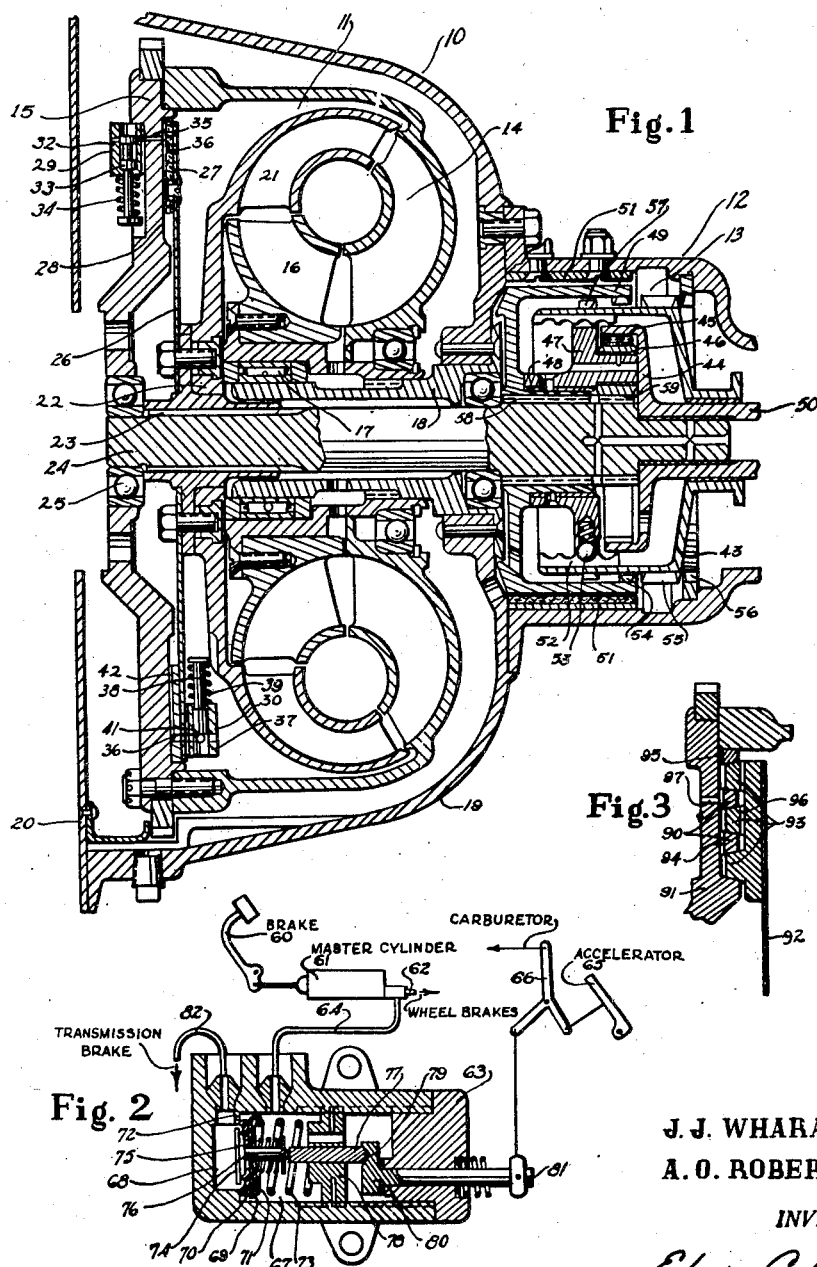
J. J. WHARAM
A. O. ROBERTS
INVENTORS Patented Dec. 28, 1948

2,457,729

UNITED STATES PATENT OFFICE 2,457,729

AUTOMATIC BRAKE CONTROL

Albert O. Roberts and John J. Wharam, Dearborn, Mich., assignors to Ford Motor Company, Dearborn, Mich., a corporation of Delaware Application April 19, 1945, Serial No. 589,164

7 Claims. (Cl. 192—3)

This invention relates to hydraulic torque conversion devices of the type employed on motor vehicles; and, more particularly, to an automatic anticreep device to be incorporated in such devices to overcome the creeping effect of Fottinger type rotors operated at idling speeds.

The general type of transmission which is contemplated is shown in our copending application 574,652, filed on January 26, 1945, now matured into United States Letters Patent 2,404,657, issued July 23, 1946, and reference may be made to it for a more complete discussion of the advantages of the particular type shown. However, this transmission—as do all of those employing Fottinger type rotors as the hydraulic coupling or torque conversion unit—is characterized by tendency to creep at idling speeds which requires constant braking on the part of the operator to hold the vehicle at rest. A number of expedients have been proposed to overcome this defect, which is inherent in the coupling; but, as a last resort, it is almost universal practice to advise the operator to rely upon his emergency brake or to hold the service brake engaged during idling periods. This is practicable from a mechanical standpoint, and is entirely effective so long as the operator remembers to apply the brake. Yet, not infrequently, this precaution is overlooked and the car will begin to move when the engine is operating at idling speed and when, normally, the established torque paths through the transmission are disengaged. The advantage of the present construction is that a brake is provided which operates automatically and which obviates the disadvantages inherent in systems which require the direct attention of the operator. Another advantage with the present system is that it utilizes, as an activating element, portions of the braking system already applied on the motor vehicle, reducing the cost of the installation. Still another advantage is that the control of the anticreep device is interlocked with the operating controls of the vehicle so that when these latter controls are operated in the normal manner to bring a vehicle to a stop, the anticreep brake is automatically activated and when the controls are operated to increase the engine speed above idling, the brake is automatically disengaged. This provides positive assurance that the anticreep brake will be applied under those conditions in which it is required, and that this application will be effected merely through the normal operation of the vehicle. A further advantage of the present construction is that it is operated hydraulically making use of the general hydraulic system installed on the car to operate the vehicle brakes, and is quiet and certain in operation and effective at all times.

With these and other objects in view, the invention consists in the arrangement described in the specification, claimed in the claims, illustrated in the accompanying drawings, in which:

Figure 1 is a longitudinal cross sectional view of a hydraulic transmission embodying the present invention.

Figure 2 is an enlarged longitudinal section through the pressure retaining device applied in carrying out the invention, the mechanism connecting therewith being shown diagrammatically.

Figure 3 is a modified clutch plate design which may be used in place of the conventional clutch facing shown in Figure 1.

As noticed above, the transmission is of the general type shown in our United States Letters Patent 2,404,657, and for a complete description of its construction, reference is made to that instrument. It suffices to note here that it comprises basically, a torque converter 10 employing a Fottinger type coupling 11 and a gearbox 12 enclosing a planetary gearing system 13. The coupling or conversion unit 11 includes the impeller rotor 14 fixed for rotation with the flywheel 15 which, in turn, is secured in the usual manner to an engine crankshaft. The reaction rotor 16 is mounted through the intermediary of an overrunning clutch 17 on the sleeve 18 which is rigidly secured to the converter housing 19 fixedly secured to the engine. The runner 21 is mounted on the hub 22 which is splined at 23 to the transmission shaft 24, journaled at 25 in the flywheel 15. A clutch plate 26 is secured to the hub 22 and has a peripheral clutch facing 27 adapted to cooperate with the face 28 on the flywheel 15.

The engagement of the clutch is effected through the pressure of the hydraulic fluid within the converter housing as controlled by the centrifugally operated valves 29 and 30 mounted on the flywheel 15 and clutch plate 26, respectively. The valve 29 comprises a casing 32 in which the dumbbell valve 33 is arranged to slide radially with respect to the axis of the transmission and is normally resiliently urged inwardly by the spring 34. An oil duct 35 extends through the casing 32 and the body of the flywheel 15 adjacent the annular oil groove 36 in the clutch facing 27. It is apparent that the valve 29 is normally closed, but that when the rotation of speed of the flywheel increases, beyond a certain point, it will open and permit free flow from between the clutch facing and the rear face of the flywheel to the space forwardly of the flywheel.

The valve 30 includes a casing 37 in which a plunger valve 38 is radially arranged with respect to the shaft of the transmission and is normally urged inwardly by the spring 39. An oil duct 41 extends through the casing 37, the clutch plate 26 and the clutch facing 27 to the radial oil groove 42 intersecting the annular groove 36. This valve is normally open when the clutch plate is not rotating or is rotating at low speeds. However, the centrifugal force imposed will cause it to close as the clutch plate speed exceeds a predetermined minimum. The precise operation of the clutch is described at length in United States Letters Patent 2,404,657 and will not be repeated here.

The gearing system referred to above comprises the shiftable drum 43 slidably mounted on the forward extension 44 of the driven shaft 50, which is rotatably mounted on the rear end of the transmission shaft 24. The extension 44 terminates an internally toothed drum 45 engaging a planet pinion 46, rotatably supported on the carrier 47, which, in turn, is rotatably mounted on the rearward extension 48 of the brake drum 49. The brake drum 49 is encompassed by a conventional hydraulically operated contacting brake band 51, permitting engagement of the gearing without the interposition of a separate clutch, which is anchored to the gearbox housing. The drum 43 carries an internally disposed selector ratchet 52 engaging with the ball selector 53 on the carrier 47, permitting common rotation of drum 43 and carrier 47 in different relative longitudinal positions. The brake drum 49 is splined to the shaft 24 at 58 and the pinion 46 also engages the sun pinion 59 integral with the shaft.

As shown in the drawing, the transmission is in neutral position. Moving the drum 43 one step towards the left engages the forward speed through the driving engagement of the carrier 47 with the drum 43, and the engagement of the internal ring gear 54 on the brake drum 49 with the external gear 55 on the shiftable drum 43. Reverse operation is obtained by moving the shiftable drum 43 one space to the right of neutral position leaving the carrier 47 and the drum 43 fixed for common rotation, and the reaction is provided by the internal ring gear 56 secured to the housing engaging the external gear 55 on the drum 43. A complete lock is obtained by moving the drum 43 one step further to the right in which case the second external gear 57 on the drum 43 engages the internal gear 54 on the brake drum 49, and the external gear 55 is locked to the housing through the ring gear 56.

The invention, in the present application, is deemed to reside in the means which are used to prevent creep at idling speeds. Of course, in the broader aspects, this is equally applicable to any vehicle application in which automatic setting of the brakes is desirable and in which release may be effected by operation of the accelerator. In the present instance, Figure 2 shows diagrammatically, one such hookup applied to a vehicle having the usual hydraulic wheel brakes and a transmission brake of the type shown in Figure 1. In this view, the brake pedal is indicated at 60 and its depression operates the master cylinder 61. The operating fluid under pressure from the cylinder operates the regular wheel brakes through the duct 62 and is also transmitted to the pressure maintenance device 63 through the duct 64. It is usual in hydraulic brakes to maintain the fluid in the brake lines under a minimum pressure less than that required to operate the brakes which has been found helpful in preventing leakage. This basic pressure maintenance device is here incorporated in the master cylinder and is effective throughout the system beyond the cylinder. In addition, the pressure maintenance device 63 is set to maintain a somewhat higher pressure in that portion of the system beyond it, sufficient to operate the brakes in the portion of the system controlled by it, but provided with means to relieve this higher pressure to disengage the brakes. Here the pressure relief is effected by the accelerator 65 which, on depression, operates the throttle valve in the engine carburetor in the usual manner and rotates the control shaft 81 of the pressure maintenance device through the Y link 66. The duct 82 leads to the transmission brake operating cylinder connected with the brake band 51 of Figure 1.

The pressure maintenance device 63 includes a principal chamber 67 in direct communication with the duct 64 from the brake master cylinder and is, of course, subjected at all times to brake fluid under the pressure imposed by the master cylinder. It also includes a retaining chamber 68 separate from the principal chamber 67 by the valve mechanism 69. This valve mechanism includes an annular rubber washer 70 formed about a metallic reinforcing washer 71 and normally urged into sealing engagement with the wall 72 separating the two chambers by means of a spring 73. The central aperture in the annular washer 70 is normally closed by a plunger valve 74, resiliently urged into sealing engagement by the spring 75. The valve 74 has an extending shank 76 engaging the shaft 77 which is mounted for reciprocal movement in the cross wall 78 and has its outer end engaging a cam depression 79 in the head 80 of the operating shaft 81. The cross wall 78 is threaded in the casing and may be advanced or retracted to adjust the effect of the spring 73.

When the master brake cylinder 61 is operated, the fluid in the principal chamber 67 is subjected to considerable pressure and the plunger valve 74 is opened equalizing the fluid pressure in the retaining chamber 68. Thus the wheel brakes are operated through the duct 62 and the transmission brake through the duct 82 in the particular hookup shown. When the brake pedal is released, the pressure in the lines to the wheel brakes begins to drop to the minimum established by the master cylinder pressure control and the same condition applies in the principal chamber 68 of the pressure retaining device 63. However, this reduction in pressure permits the seating of the plunger valve 74. The pressure in the retaining chamber 68 is then somewhat higher and the annular valve 70 will be unseated until the pressure in the retaining chamber reaches a predetermined minimum level determined by the resistance of the spring 73, when the valve 70 will again close. This structure is basically the same as that usually employed in the master cylinder, but the spring 73 is so proportioned that a substantially higher pressure is maintained in the retaining chamber and hence in the line 82 leading to the transmission brake than obtains in the lines 62 leading to the wheel brakes. The brakes themselves are so constructed that they will not engage at the lower pressure, but will be engaged at the minimum pressure obtaining in the retaining chamber and in the transmission brake line. Thus, when the brake pedal is depressed initially, both the wheel and transmission brakes are actuated in the usual manner; and when the brake pedal is released, the wheel brakes are disengaged (although the fluid in the line 62 remains under a predetermined minimum pressure) while the transmission brake because of the higher pressure maintained by the pressure retaining device 63 remains engaged and the brake drum 49 is restrained against rotation even after the brake pedal is released. It is thus apparent that after the brake pedal is applied, the transmission brake remains engaged after the pedal is released.

Complete release of the transmission brake is effected by having the accelerator 65 of the vehicle so interlocked with the operating shaft 81 of the pressure retaining device 63 that when the accelerator is depressed the head 80 is revolved and the shaft 77 is forced toward the left as it leaves the eccentric depression 79. This, in turn, pushes the shank 76 of the plunger valve 74 towards the left against the urging of the spring 75 and permits the pressure of the fluid in the retaining chamber 68 to be equalized with that obtained throughout the brake line. The resultant hydraulic pressure is the standard minimum at which all the brakes are designed to be disengaged and, accordingly, the transmission brake is released and operation of the gearing system is permitted.

From the foregoing, it will be noted that the mere routine activation of the vehicle brake pedal sets the transmission brake which remains in engagement, even after the brake pedal is released, until such time as the vehicle accelerator is operated. This provides a direct anticreep protection through the transmission brake; and this braking operation is entirely automatic—both as to engagement and release—and follows directly upon the normal operation of the vehicle, since it is always necessary to depress the accelerator to some extent before forward movement can be resumed.

Figure 3 shows an alternative construction for the clutch plate in which, in place of the customary clutch facing, annularly toothed or ridged interlocking metal clutch elements are used, those on the flywheel 91 being indicated as 90 and those on the clutch plate 92 as 93. In order to permit the escape of oil from the roots of the teeth 90, radial bleeds 94 are drilled inwardly at suitable intervals from the rim of the flywheel and plugged as at 95. Similar bleeds 96 are drilled to permit the escape of fluid from the root of the clutch plate teeth 93 leading to the outer periphery of the clutch plate. A duct 97 leads through the web of the flywheel and connects to a valve of the type shown at 29 in Figure 1. This construction is particularly effective under larger loads and is easily engaged and disengaged under the slighter pressure differentials.

The advantages of the construction shown will, it is believed, be instantly apparent to those skilled in this art. The need has been recognized for some type of automatic breaking control when the engine is idling. The difficulty has been to obtain such a control in the course of normal operation of the vehicle, without reliance upon the specific attention of the operator to effect it. In the present case, this is accomplished since any routine operation of the main brakes sets the auxiliary brake. Yet the auxiliary brake is immediately released when, following the routine operation of the accelerator before forward movement is resumed, the pressure existing in the auxiliary brake line is reduced to a point at which this brake is released. Thus, the construction is entirely automatic and extremely simple to operate and build.

Some changes may be made in the arrangement, construction, and combination of the various parts of the improved construction without departing from the spirit of the invention, and it is the intention to cover by the claims such constructions as may reasonably be included within the scope thereof.

We claim as our invention:

1. In an automotive control device, for vehicles having a transmission brake and a plurality of wheel brakes, a brake operating pedal, brake activating means effective on operation of said pedal to operate both said wheel brakes and said transmission brake, means associated with said brake activating means effective on release of said brake pedal to disengage said wheel brakes while retaining engagement of said transmission brake, an accelerator control, and an interlock between said accelerator control and said associated means to disengage said transmission brake on operation of said accelerator control.

2. In an automotive control device for vehicles including a fluid transmission having associated therewith a transmission brake and a plurality of wheel brakes, a brake operating pedal, brake activating means effective on operation of said pedal to operate both said wheel brakes and said transmission brake, means associated with said brake activating means effective on release of said brake pedal to disengage said wheel brakes while retaining engagement of said transmission brake, an accelerator control, and an interlock between said accelerator control and said associated means to disengage said transmission brake on operation of said accelerator control.

3. In an automotive braking system, a brake pedal, an accelerator control, a first braking means, a second braking means, a hydraulic brake master cylinder effective on operation of said brake pedal to supply fluid to the lines leading to said braking means under pressure sufficient to operate both said braking means and on release of said pedal to diminish said pressure at the master cylinder below a point sufficient to maintain engagement of both said braking means, pressure retaining means interposed in the line leading to said first braking means effective on said release to maintain sufficient pressure at said first braking means to continue engagement of said first said braking means, and a connection between said accelerator control and said pressure retaining means, effective on operation of said accelerator control to diminish said last-named pressure at said first breaking means to disengage said first braking means.

4. In an automotive control device, a hydraulic transmission, a hydraulic brake incorporated in said transmission, a brake pedal, an accelerator control, a plurality of wheel brakes, a hydraulic brake master cylinder effective on operation of said brake pedal to supply fluid to the lines leading to said braking means under pressure sufficient to operate both said wheel and transmission brakes and on release of said brake pedal to diminish said pressure at said master cylinder below a point sufficient to maintain engagement of both said wheel and transmission brakes, pressure retaining means interposed in the line leading to said transmission brake effective on such release to maintain sufficient pressure at said transmission brake to continue engagement of said transmission brake, and a connection between said accelerator control and said retaining means, effective on operation of said accelerator control to diminish said last-named pressure at said transmission brake to disengage said transmission brake.

5. In a hydraulic braking system, a brake pedal operating a master cylinder, a plurality of fluid supply lines leading from said cylinder to individual brakes, means at said cylinder to maintain a predetermined minimum pressure in said lines insufficient to operate said brakes, a pressure retaining means in the line to at least one said brake effective to maintain pressure up to a predetermined minimum the pressure established by the operation of the pedal after operation and release of the pedal, said predetermined minimum being sufficient to maintain said one brake in engagement, and selectively controlled means to render said pressure retaining means inoperative and to disengage said one brake.

6. In an automotive control device, a brake pressure retaining means including a casing, a brake pedal operating a master cylinder supplying fluid under pressure to a first chamber in said casing, a second chamber in said casing, a valve between said chambers adapted to permit flow of fluid from said first to said second chambers on operation of said brake pedal and to close on release of said brake pedal, a second spring loaded valve in said pressure retaining means between said chambers effective to release fluid from said second chamber when said brake pedal is released until a predetermined minimum pressure is obtained in said second chamber, and selectively controlled unseating means effective to unseat said first valve to permit equalization of pressures in said two chambers, said unseating means comprises a shaft rotatable mounted in said casing, an eccentric cam surface on said shaft effective to unseat said first valve, and a connection between said shaft and an accelerator pedal effective to rotate said shaft on operation of said accelerator.

7. In an automotive control device, a brake pressure retaining means including a casing, a brake pedal operating a master cylinder supplying fluid under pressure to a first chamber in said casing, a second chamber in said casing, a valve between said chambers adapted to permit flow of fluid from said first to said second chambers on operation of said brake pedal and to close on release of said brake pedal, a second spring loaded valve in said pressure retaining means between said chambers effective to release fluid from said second chamber when said brake pedal is released until a predetermined minimum pressure is obtained in said second chamber, and selectively controlled unseating means effective to unseat said first valve to permit equalization of pressures in said two chambers, said unseating means includes a shaft rotatably mounted in said casing, an eccentric cam formed at inner end of said shaft, means effective between said cam and said first valve to unseat said valve, and a connection between said shaft and the accelerator of a vehicle upon which said control device is installed adapted on operation of said accelerator to rotate said shaft to equalize the fluid pressure in said two chambers.

ALBERT O. ROBERTS.
JOHN J. WHARAM.

REFERENCES CITED

The following references are of record in the file of this patent:

UNITED STATES PATENTS

| Number | Name | Date |
|---|---|---|
| 1,724,568 | Durning et al. | Aug. 13, 1929 |
| 1,799,495 | Bendix | Apr. 7, 1931 |
| 2,028,491 | Barrett et al. | Jan. 21, 1936 |
| 2,030,288 | Freeman | Feb. 11, 1936 |
| 2,080,295 | Wheeler et al. | May 11, 1937 |
| 2,151,278 | Milhaupt | Mar. 21, 1939 |
| 2,262,842 | Goepfrich | Nov. 18, 1941 |
| 2,285,781 | Patrick | June 9, 1942 |